(12) United States Patent
Ott et al.

(10) Patent No.: US 9,477,823 B1
(45) Date of Patent: Oct. 25, 2016

(54) SYSTEMS AND METHODS FOR PERFORMING SECURITY AUTHENTICATION BASED ON RESPONSES TO OBSERVED STIMULI

(71) Applicant: Smart Information Flow Technologies LLC, Minneapolis, MN (US)

(72) Inventors: Tammy Elizabeth Ott, St. Paul, MN (US); Daniel Jay Thomsen, Minneapolis, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 147 days.

(21) Appl. No.: 14/193,621

(22) Filed: Feb. 28, 2014

Related U.S. Application Data

(60) Provisional application No. 61/792,780, filed on Mar. 15, 2013.

(51) Int. Cl.
*G06F 12/14* (2006.01)
*G06F 21/31* (2013.01)
*G06F 21/32* (2013.01)

(52) U.S. Cl.
CPC ............ *G06F 21/31* (2013.01); *G06F 21/316* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 7,237,123 B2 | 6/2007 | LeVine et al. | |
| 7,496,768 B2 | 2/2009 | Roberts et al. | |
| 7,552,467 B2 | 6/2009 | Lindsay | |
| 7,562,227 B1 | 7/2009 | Cox et al. | |
| 7,921,454 B2 | 4/2011 | Cerruti et al. | |
| 7,945,947 B1 | 5/2011 | Chudow | |
| 8,087,068 B1 | 12/2011 | Downey et al. | |
| 8,096,657 B2 | 1/2012 | Pompilio et al. | |
| 8,161,530 B2 | 4/2012 | Meehan et al. | |
| 8,250,371 B2 | 8/2012 | Darbha et al. | |
| 8,353,017 B2 | 1/2013 | Cerruti et al. | |
| 8,375,438 B1 | 2/2013 | Ten Brink | |
| 8,387,109 B2 | 2/2013 | Ureche et al. | |
| 8,387,111 B2 | 2/2013 | Koved et al. | |
| 8,387,118 B2 | 2/2013 | Zubas et al. | |
| 8,387,119 B2 | 2/2013 | Patel et al. | |

(Continued)

OTHER PUBLICATIONS

Killourhy et al., "The Effect of Clock Resolution on Keystroke Dynamics," Recent Advances in Intrusion Detection, Lecture Notes in Computer Science, vol. 5230, p. 331-350, 2008 (20 pages).

(Continued)

*Primary Examiner* — Fatoumata Traore
(74) *Attorney, Agent, or Firm* — JoAnn M. Seaton; Griffiths & Seaton PLLC

(57) ABSTRACT

A method performed by an authentication processor for authenticating an unknown user claiming to be a legitimate user. The method includes comparing a legitimate user response metric to an unknown user response metric and one of preventing access to the computer system and decreasing a level of access to the computer system when the unknown user response metric differs from the legitimate user response metric by more than a predefined degree of acceptable variation. The legitimate user response metric represents observed changes in micro-behaviors of the legitimate user in response to viewing a plurality of prime images. The unknown user response metric represents observed changes in micro-behaviors of the unknown user in response to viewing the plurality of prime images.

20 Claims, 7 Drawing Sheets

(56) References Cited

U.S. PATENT DOCUMENTS

| | | | |
|---|---|---|---|
| 8,387,121 B1 | 2/2013 | Surti | |
| 8,627,421 B1 | 1/2014 | Bowers et al. | |
| 2003/0046401 A1 | 3/2003 | Abbott et al. | |
| 2005/0022034 A1* | 1/2005 | Chaudhari | G06F 21/32 726/19 |
| 2005/0138658 A1 | 6/2005 | Bryan | |
| 2008/0263636 A1 | 10/2008 | Gusler et al. | |
| 2009/0063866 A1* | 3/2009 | Navratil | G06F 21/32 713/186 |
| 2010/0036783 A1 | 2/2010 | Rodriguez | |
| 2012/0141970 A1 | 6/2012 | Pompilio et al. | |
| 2013/0239191 A1* | 9/2013 | Bostick | G06F 21/316 726/7 |
| 2014/0020089 A1* | 1/2014 | Perini, II | G06F 21/32 726/19 |

OTHER PUBLICATIONS

Giot, Romain, Mohamad El-Abed, and Christophe Rosenberger, "Keystroke Dynamics Authentication," Biometrics, InTech, Ch. 8, p. 157-182, Jun. 20, 2011 (27 pages).

Monrose, Fabian, and Aviel D. Rubin, "Keystroke dynamics as a biometric for authentication," Future Generation Computer Systems 16.4, p. 351-359, 2000 (9 pages).

Renaud, Karen, and Heather Crawford, "Invisible, Passive, Continuous and Multimodal Authentication," Mobile Social Signal Processing, Lecture Notes in Computer Science, Springer Berlin Heidelberg, vol. 8045, p. 34-41, 2014 (8 pages).

Zargarzadeh, Mehrzad, and Keivan Maghooli, "A Behavioral Biometric Authentication System Based on Memory Game," Biosciences Biotechnology Research Asia, vol. 10(2), p. 781-787, 2013 (7 pages).

Bargh, John A. et al., "Automaticity of Social Behavior: Direct Effects of Trait Construct and Stereotype Activation on Action", Journal of Personality and Social Psychology 1996, vol. 71, No. 2, pp. 230-244 (15 pages).

Bojinova, Hristo et al., "Neurscience Meets Cryptography: Designing Crypto Primitives Secure Against Rubber Hose Attacks", Security '12 Proceedings of the 21st USENIX conference on security symposium, USENIX Association, Berkley, California, Aug. 8, 2012 (13 pages).

Chiou, Wen-Bin et al., "A new look at software piracy: Soft lifting primes an inauthentic sense of self, prompting further unethical behavior", Int. J. Human-Computer Studies 70, 2012 pp. 107-115 (9 pages).

Clapham, Eric, "Picture Priming: Multiple Primes Under Conditions of Normal and Limited Awareness", dissertation University of Nevada, Reno, May 2009 (90 pages).

Denning, Tamara et al., "Exploring Implicit Memory for Painless Password Recovery", RSA Labs, University of Washington, 2011 (4 pages).

Krosnick, Jon A. et al., "Sublimintal Conditioning of Attitudes", Society for Personality and Social Psychology, Inc., vol. 18 No. 2, Apr. 1992 pp. 152-162 (11 pages).

Quinn, Kimberly A. et al., "Familiarity and person construal: Individuating knowledge moderates the automaticity of category activation", European Journal of Social Psychology, vol. 39 pp. 852-861, 2009 (11 pages).

Revett, Kenneth et al., "On the Deployment of Password Hints Using Pre-Attentive Visual Priming for One-Time Passwords", International Journal of Computing Academic Research, vol. 1, No. 2, pp. 66-78, Dec. 2012 (13 pages).

Weinshall, Daphna, "Cognitive Authentication Schemes for Unassisted Humans, Safe Against Spyware", The Hebrew University of Jerusalem, School of Computer Science and Engineering, Israel, 2006 (18 pages).

\* cited by examiner

| PRIME IMAGE CLASS (VISUAL CHORD NOTES) | PRIME IMAGE EXAMPLE | EXPECTED RESULTS | |
|---|---|---|---|
| | | LEGITIMATE USER | IMPOSTOR |
| FAMILIAR TO USER | ELDER<br>AGGRESIVE ASSOCIATION<br>STRESS INDUCING | UNIQUE IMPACT<br>UNIQUE IMPACT<br>UNIQUE IMPACT | SLOWING AND MORE ERRORS<br>STACCATO KEYSTROKES<br>SLOWING BETWEEN KEYSTROKES |
| EVALUATIVELY CONDITIONED (EC) | IMAGE PAIRED WITH GRADUATE<br>IMAGE PAIRED WITH CHEETAH<br>IMAGE PAIRED WITH POLITICIAN | LESS ERRORS<br>INCREASE SPEED<br>INCREASE KEYSTROKES | NO IMPACT<br>NO IMPACT<br>NO IMPACT |
| COUNTER TO IMPOSTOR GOALS | HONESTY ASSOCIATION<br>POLICE | UNIQUE IMPACT<br>UNIQUE IMPACT | CHANGE IN GOAL DIRECTED BEHAVIOR<br>CHANGE IN GOAL DIRECTED BEHAVIOR |

Fig. 2

SYSTEMS AND METHODS FOR PERFORMING SECURITY AUTHENTICATION BASED ON RESPONSES TO OBSERVED STIMULI

CROSS-REFERENCE TO RELATED APPLICATION

This application is a non-provisional application of and claims priority under 35 U.S.C. §119(e) to U.S. Patent Application No. 61/792,780, filed Mar. 15, 2013, which is incorporated herein by reference.

BACKGROUND OF THE INVENTION

Security and authentication systems generally require users to explicitly recall user memories or learning, for example, passwords or identification numbers, and to consciously enter such information into the validating system. These authentication tactics have an inverse relationship between security and usability. For instance, making passwords more complex increases security at the expense of an increased cognitive burden on the user. Conversely, making passwords simpler to ease the cognitive burden on the user comes at the expense of overall security. Weaknesses in human memory also present limitations on possible security passwords and/or decrease the effectiveness of systems relying on conscious user memories to gain system access.

BRIEF SUMMARY OF THE INVENTION

One embodiment of the invention relates to a method performed by an authentication processor for authenticating an unknown user claiming to be a legitimate user. The method includes comparing a legitimate user response metric to an unknown user response metric and one of preventing access to the computer system and decreasing a level of access to the computer system when the unknown user response metric differs from the legitimate user response metric by more than a predefined degree of acceptable variation. The legitimate user response metric represents observed changes in micro-behaviors of the legitimate user in response to viewing a plurality of prime images. The unknown user response metric represents observed changes in micro-behaviors of the unknown user in response to viewing the plurality of prime images. In one example, images are consciously viewed, while in another example, the images are only viewed on subconscious level. In one example, the method continuously authenticates the legitimate user while allowing the user to normally interact with the system without interruption. Other associated embodiments, methods, systems, etc. are also described herein.

BRIEF DESCRIPTION OF THE DRAWINGS

Embodiments of the invention will be described with respect to the figures, in which like reference numerals denote like elements, and in which:

FIG. 2 is a table of prime image classes, according to one embodiment of the invention.

DETAILED DESCRIPTION

Only a minor fragment of the ability of the human mind is consciously realized. It has been estimated that the capacity of our senses is 200,000 times greater than the capacity of our consciousness such that a decision that can be made in ten minutes by the subconscious processing of information would require four years for conscious processing (Dijksterhuis, Aarts, & Smith, P. K., "The power of the subliminal: On subliminal persuasion and other potential applications," *The New Unconscious*, pp. 77-106. New York; Oxford University Press). A large majority of human decisions are made without a conscious analytical process, but rather are made using subconscious analytics that are consciously imperceptible. Such decisions affect social perceptions and attitudes as well as behaviors.

The authentication system of the current invention displays an image or a sequence of images to a user attempting to access a computer system, observes the user's response to the display images, and authenticates the user selectively allowing access to the computer system based on the observations. In one example, each of the one or more images is displayed to the user for a very short duration of time such that each image is only perceivable by the subconscious of the user, that is, is not consciously perceivable by the user. In another example, images are each displayed to the user for a supraliminal duration long enough for conscious perception of the image. The observed behavior, in one example, includes micro-behaviors exhibited in the user's interaction with the computer system. For example, micro-behaviors observed include keyboard dynamics and/or mousing behaviors of the user or, for instance, when using mobile computing devices, device movement (e.g., how they hold and/or move the mobile device) or texting patterns. The authentication system observes the changes in the micro-behavior of the user following display of each of the one or more images and compares those changes to the expected changes in micro-behavior previously established for a verified, legitimate user. If the observed micro-behaviors substantially match the expected changes for a legitimate user, the user is determined to be the legitimate user as claimed, and access to the computer system is permitted. If the observed micro-behaviors do not match the expected changes for the legitimate user, the user is determined to be an impostor, and access to the computer system is either denied or limited. Accordingly, authentication is performed without relying on the overt participation or explicit conscious memories of the individual involved.

Figure 1:
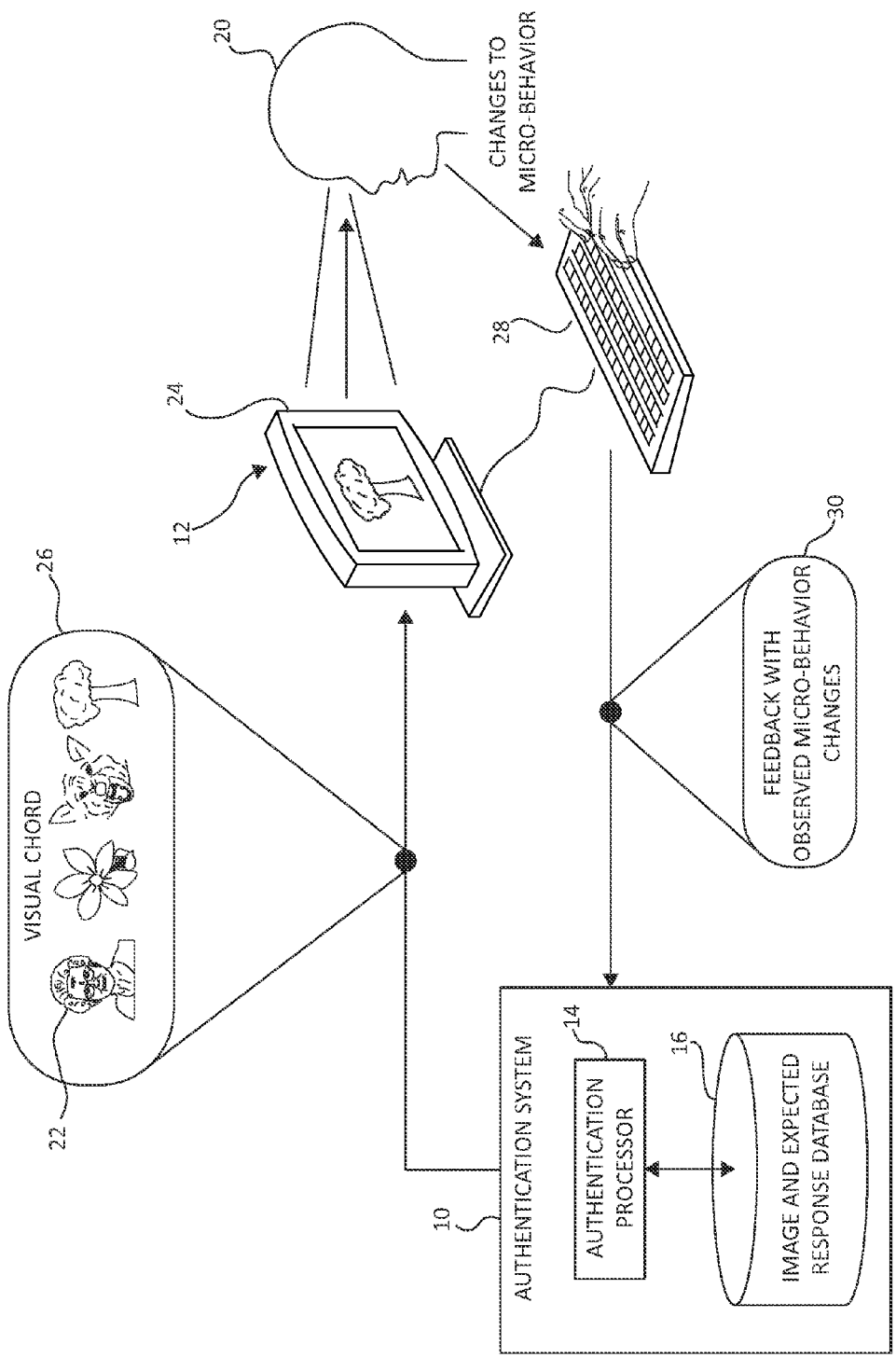
FIG. 1 is a schematic diagram of an authentication system and process for authenticating a user based on user responses to observed stimuli, according to one embodiment of the invention.

FIG. 1 schematically illustrates an example authentication system 10 integrated in a secure computer system 12. Computer system 12 may be implemented as a whole or part of a server system, a networked computer, a standalone computer, a mobile computing device (e.g., mobile phone, tablet, etc.), or other suitable system. Authentication processor system 10 includes an authentication processor 14 in communication with a database(s) 16 including a library of images and expected responses for each of the images for each of a plurality of legitimate users. The authentication processor 14 communicates with the computer system 12 and instructs the computer system 12 to display selected images 22, from the database(s) 16, to the user 20 via a monitor 24 or other visual display for short durations, e.g., durations not consciously perceived by the user 20. In one embodiment, the selected images 22 are considered to be subconsciously displayed and not consciously perceivable by the user 20 when they are displayed for durations less than about 16 milliseconds. In another example, the selected images 22 are supraliminally displayed, e.g., for durations longer than about 16 milliseconds, such that the user 20 has conscious awareness of the images 22 being viewed. In one example, the selected images 22 are displayed between consciously perceived program images. In one example, groups of selected images 22 are presented as a visual chord 26, which will be further defined below.

The authentication processor 14 receives feedback 30 from the computer system 12 about changes to observable user micro-behavior, e.g., as perceived via keyboard dynamics including keystroke duration, key hold-down time, time gaps between strokes, etc. or changes in user interaction with a mouse (not shown), or through the accelerometers of a smartphone that indicates how the device is held or other interaction with an input device 28, following the display of each selected image 22. Authentication processor 14 compares the feedback 30 to expected responses for the expected legitimate user from the database(s) 16. If the feedback 30 substantially matches the expected responses, the user 20 is authenticated and permitted to continue to access computer system 12 at the level set for the user 20. If the feedback 30 does not match the expected responses, the user 20 is identified as an impostor and denied further access to the computer system 12 or at least the level of access to the computer system 12 is limited to less than allowed for the expected user. In one example, the authentication process is continuously or periodically performed while the user 20 interacts with the system to ensure it is still the legitimate user interacting with computer system 12.

Images displayed to the user are prime images selected from natural prime images or prime images resulting from evaluative conditioning. "Prime images" as used in this application refer to images that evoke observable response from the legitimate user. Natural prime images are images that evoke response due to natural behavior that is not the result of particular conditioning or training Prime images due to evaluative conditioning evoke response or a particular response due to prior, subconscious or other conditioning or training of the legitimate user. In one embodiment, the system and method of this innovation utilizes at least three different classes of prime images as shown in the table of FIG. 2 including prime images that are (1) familiar to the cleared user, (2) evaluatively conditioned to the user, and (3) counter to impostor goals. Each of these three classes of prime images is expected to produce different observable micro-behaviors by the legitimate user than by an impostor.

For example, common prime images are images that generally invoke the same observable micro-behavior in substantially all users. For example, viewing images of the elderly generally results in slower interaction between a user and the computer interface further characterized by an increasing amount of error. Viewing images of slow animals, such as turtles or snails, cause slowed micro-behaviors, and viewing images of fast animals, such as cheetah or gazelle, conversely result in faster micro-behaviors. Viewing images of subjects of stereotypes of aggression, e.g., images of aggressive or hostile words or situations, generally results in staccato in a user's keystrokes or other interaction with the computer interface. Additionally, viewing stress-inducing images generally results in slowed interaction with a computer interface. These examples of images likely to alter a user's micro-behaviors are not exhaustive as many other such images are known and are likely to be discovered in the future.

While these common prime images generally hold true for most individuals, the effects of prime images can be partially or entirely negated due to a user being familiar with the primed images. For example, an image of the elderly that is the grandparent of the legitimate user does not result in the slower and more error prone computer interface interaction that would be expected for members of the general public, including impostors, but rather a non-slowed micro-behavior, a less slowed micro-behavior, or other uniquely impacted micro-behavior. In one embodiment, the effect of familiarity on such subjects produces the different expected results indicated in FIG. 2. For example, while a picture of an elderly woman would make a typical user, including non-familiar impostors, to slow their micro-behaviors, e.g., keystrokes, the legitimate user who is a grandchild of the elderly woman would have an identifiably different change in their micro-behavior.

Evaluative conditioning is used to impart an emotion associated with a strong stimulus prime image to a neutral stimulus prime image through repeated pairing of the two prime images. For example, exposing an individual to a repeated pairing of a prime image of a snarling dog with a picture of a pine tree results in the pine tree inducing the same or a very similar emotions and observable micro-behavior changes as the snarling dog. The individual being conditioned may be but does not need to be aware of their viewing of the stimulus prime images for the visual pairings to result in emotional pairing. Accordingly, conditioning to create the pairings can be subconsciously presented to the individual with or without their explicit knowledge of the conditioning. Similar emotional pairings were observed and utilized, for example, to condition users to subconsciously identify particular faces using attacking animal prime images or other visceral response evoking prime images as described in U.S. patent application Ser. No. 13/676,904, entitled "Stimulus Recognition Training and Detection Methods," filed Nov. 14, 2012, which is hereby incorporated by reference in its entirety. Accordingly, evaluative conditioning results in obtaining an expected or primed reaction from a conditioned individual in response to a previously neutral stimulus prime image. The previously neutral stimulus prime image alone will generally only induce the primed reaction from individuals who have undergone the same evaluative conditioning. Therefore, by so conditioning verified legitimate users, legitimate users can be differentiated by non-conditioned or differently conditioned users including impostors, by observing the micro-behavior of the legitimate user as compared to the non-conditioned user to the conditioned prime image.

Prime images counter to the goals of the impostor also produce identifiable differences in the micro-behavior changes of legitimate users and impostors. For example, prime images of law enforcement or other prime images associated with honesty generally affect an impostor's interaction with a computer interface that they are unlawfully attempting to access.

While individual familiar prime images, evaluatively conditioned prime images, prime images counter to impostor goals, or other primed images will generally each individually present different changes in micro-behavior between legitimate users and impostors, user authentication is further increased by presenting a visual chord of primed images. Accordingly, in one embodiment, a variety of prime images are selected as notes to collectively define a visual chord to be presented to users. The various notes of the visual chord are each generally configured to impact the micro-behavior of the legitimate user in a different manner than an illegitimate user or impostor. The predicted responses of the legitimate user to the visual chord are combined into a single response metric. In one example, the visual chord includes prime image notes from a number of different prime images classes (e.g., familiar, evaluative conditioned, impostor goal adverse) in a manner collectively strengthening authentication and preventing or at least decreasing long term computer system access by various forms of impostors. For example, while a family member impostor may have similar micro-behavioral changes in response to familiar prime images, they are unlikely to have similar micro-behavioral changes in response to evaluatively conditioned primes, etc. As such, even if an impostor is able to match a legitimate user's micro-behavioral changes to one class of primes, the imposter will be identified due to observations of different micro-behavioral changes to another class of primes. Also to bolster authentication, notes of the visual chords can be selected that evoke different changes in micro-behaviors to product a rich response metric unique to the legitimate user. Sequential or simultaneously presentation of primes maybe presented in a visual chord and may further impact the resultant response metric for the legitimate user.

Figure 3:
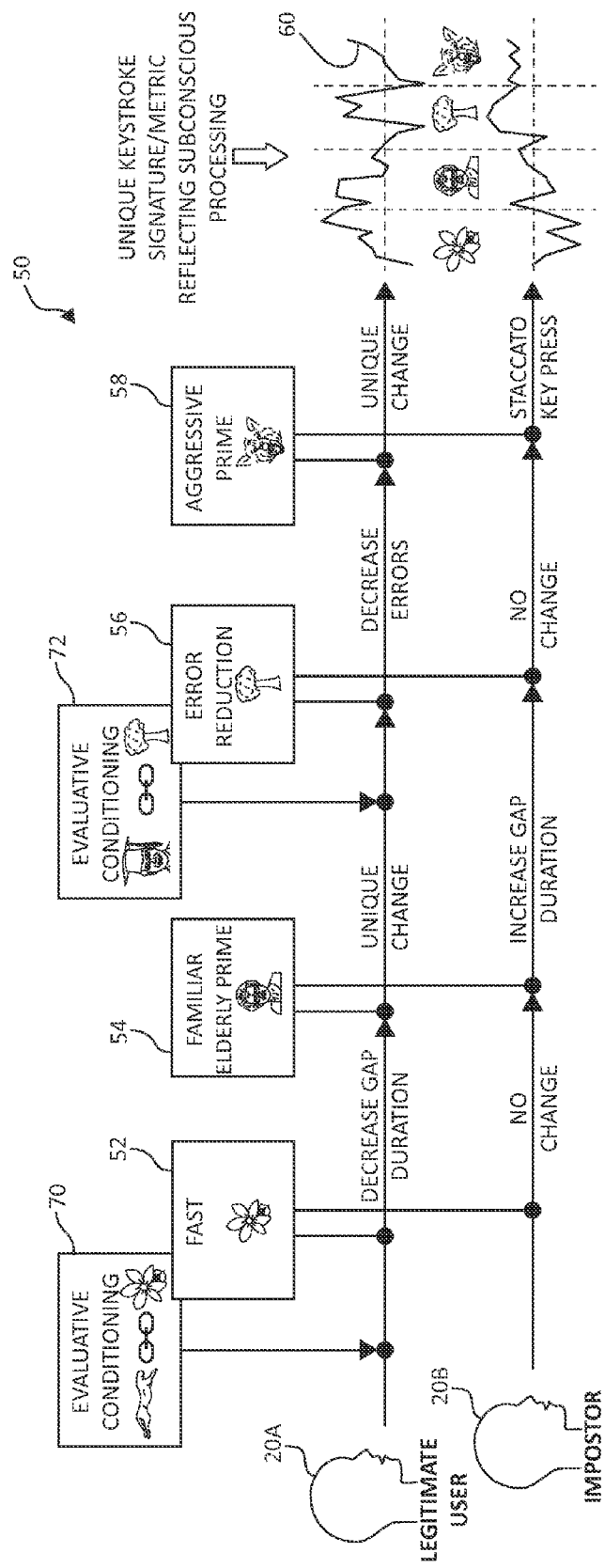
FIG. 3 is an illustration comparing expected changes in micro-behaviors between a legitimate user and an impostor during presentation of a visual chord including display of a sequence of primed images, according to one embodiment of the invention.

FIG. 3 illustrates expected changes in keystroke dynamics for a legitimate user 20A and for an impostor 20B for a sequential visual chord 50 that includes the following primes: evaluatively conditioned fast prime image 52, familiar elderly prime image 54, evaluatively conditioned error reduction prime image 56, and a naturally varying aggressive prime image 58. As shown, each individual prime image presented in the visual chord 50 produces a different change in micro-behavior for the legitimate user 20A as compared to the impostor 20B. The observed changes are collectively combined into a signature response metric or unique keystroke signature 60 for each. Notably, some of the changes in micro-behavior for the legitimate user 20A occur due to prior evaluative conditioning generally indicated at 70 and 72, which paired an emotion to an otherwise neutral prime image that is now used as the prime image (see prime images 52 and 56). Comparison of the individual response changes or differences in the signature response metric by an authentication processor will identify impostors and prevent access or change the amount of access to a computer interface and databases accessible via the computer interface while allowing legitimate users with their full level of authorized access to the computer interface and associated databases. Notably, in order to be considered a match, the expected legitimate user response metric can differ slightly from the observed user response metric and will be considered a match as long as the differences in the two response metrics fall within predetermined degree of acceptable variation. In one example, the predetermined degree of acceptable variation is selected such that the same person viewing the prime images will produce an acceptable or matching response metric 99.5% of the time. Accordingly, during multiple continuous authentication attempts, the authentication system would only mis-authenticate once out of one thousand attempts. Therefore, if two image response metrics in a row fail to match the legitimate user's response metrics, the user can be confidently identified as an impostor.

In one example, primes are presented to the user in short durations or flashes that are subconsciously, but not consciously, perceivable by the user. In this manner, authentication occurs without the active and conscious participation of the user. In this example, micro-behaviors are observed and changes evaluated during a task that may or may not be presented as an authentication task to the user. In one instance, the consciously perceivable task in which changes in micro-behaviors are observed is wholly unrelated to authentication such that the user may be consciously unaware of the ongoing authentication process. In one example, the authentication process continues periodically throughout use of the computer system to continually authenticate the user. Continual authentication is configured to prevent or decrease unauthorized access to the computer system due to physical replacement of the legitimate user with an imposter or other access breaches after initial authorization has begun or has even been completed.

Figure 4:
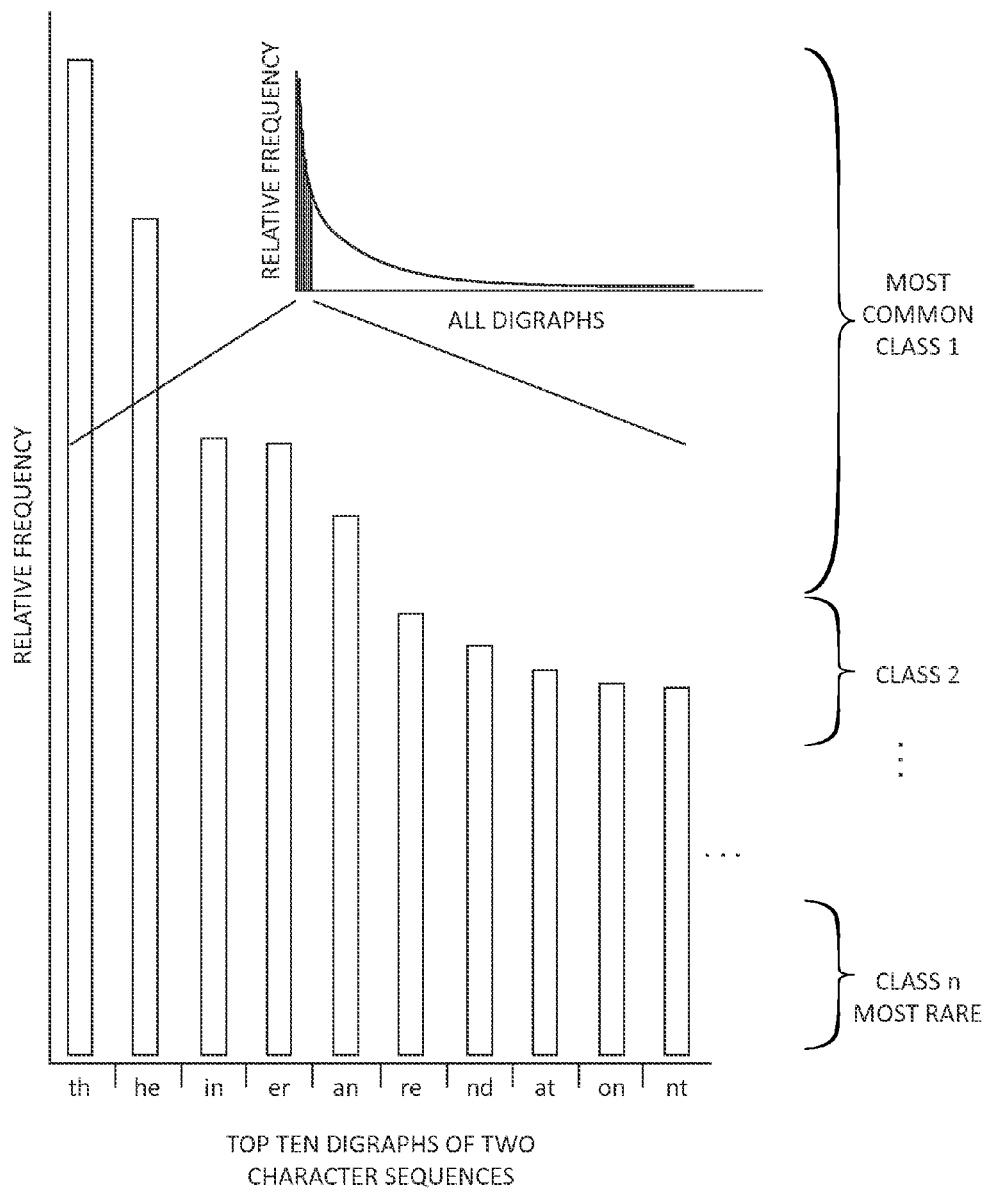
FIG. 4 is a graph of common digraphs, their frequency of use, and example digraph class categories, according to one embodiment of the invention.

In instances where the conscious tasks being completed during authentication are unrelated to the authentication process, the authentication processor does not control what the user types via the keyboard or otherwise provides input into the computer system. Accordingly, in one embodiment, the user response metric is at least partially inferred based on the particular keyboard interactions observed. In one example, such inferences are made using data mining techniques for each individual in order to group digraphs into equivalence classes based on the frequency and hand mechanics. In this manner, user authentication can take place regardless of what sequence of characters are actually typed. For example, FIG. 4 is a graph 100 showing that the most common digraphs, i.e., pairs of characters with one distinct sound, on the X-axis and their frequency along the Y-axis. The most common diagraphs have similar hand mechanics and can be grouped into a single digraph class. Each digraph in a class can be processed similarly. For instance, if a "th" is not observed in the user's typing during authentication, but a "he" is, the user's response metric can be determined and compared to the expected metric that was based in part on typing including a "th."

Relying on keystroke dynamics to provide a response metric uses data mining techniques to sift through large volumes of data and efficiently extract patterns. The authentication system of the present invention uses the extracted patterns, etc. and extracts changes to timing patterns, etc. In one embodiment, the authentication system utilizes tools such as the Waikato Environment for Knowledge Analysis (WEKA) suite of software developed at the University of Waikato in New Zealand.

Initial user authentication generally begins as soon as a user begins typing on the subject computer system to allow the necessary amount of data to be collected as quickly as possible to limit any potential impostors access to the computer system. Generally speaking, systems requiring continuous authentication are sufficiently protected to require at least four minutes of interaction to compromise data or programs stored therein or otherwise accessible via the computer system. By running three authentication scans per minute, per one example, an impostor will fail five scans in under two minutes allowing sufficient time to eject the imposter from computer system and warn administrators. In one embodiment, rather than immediately ejecting an impostor from the computer system, the impostor is directed to a fake computer interface that does not alert the impostor his/herself to their own security breach (since authentication occurs subconsciously, the impostor is not aware of their failure to pass through the process) to allow administrators and/or security the necessary time required to approach and apprehend the impostor rather than immediately suspending any access, which would alert the impostor to his discovery by the authentication system.

Figure 5:
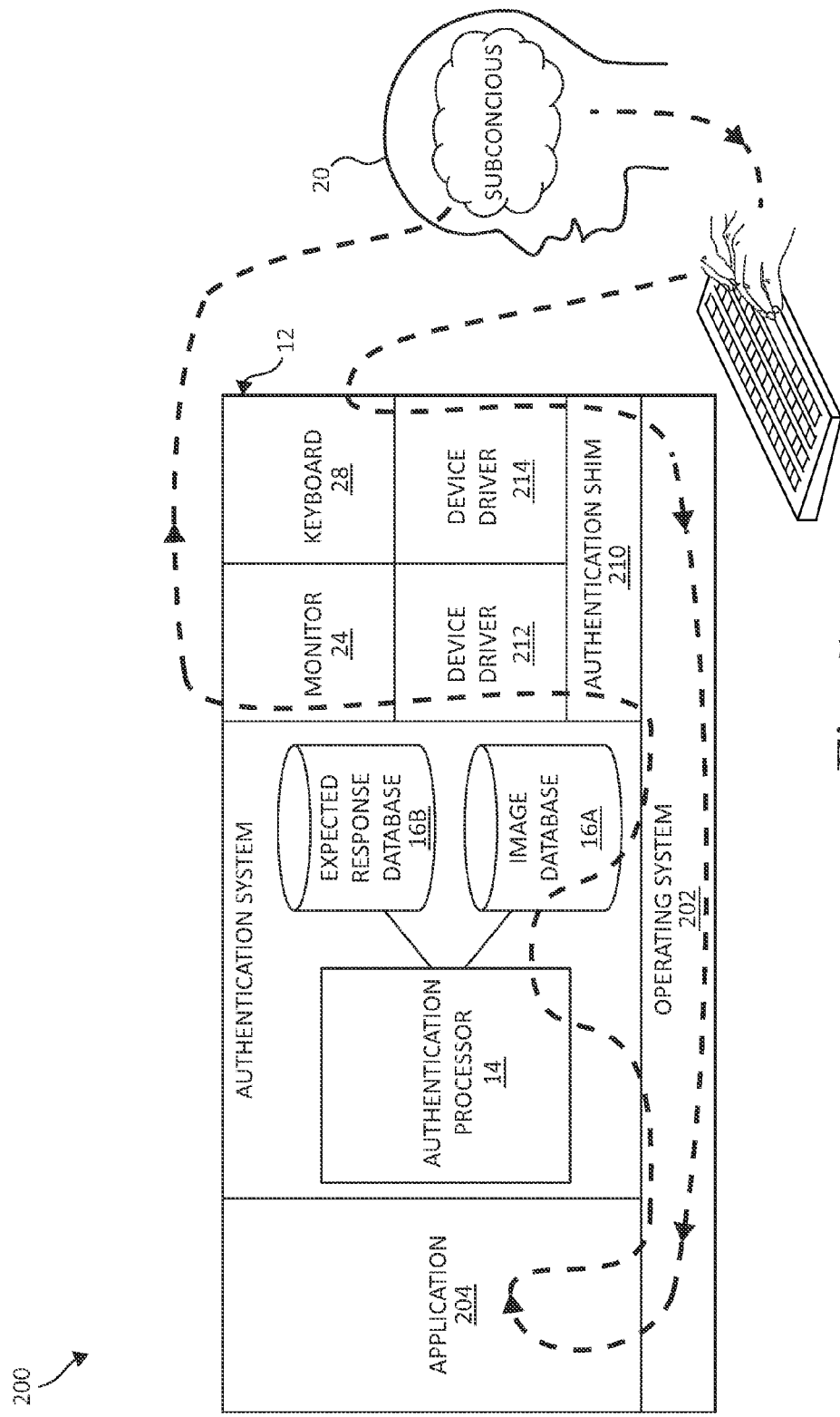
FIG. 5 is a block diagram of a computer system architecture with integrated authentication system and an associated user, according to one embodiment of the invention.

The above discussion of the authentication system can be implemented in a number of different architectures as will be apparent to those of skill in the art upon reading this application. FIG. 5 illustrates one example of a system architecture 200 implementing the current innovation. The system architecture 200 integrates authentication system 10 in the overall architecture of computer system 12 such that authentication system 10 works in flow with an existing operating system 202 and applications 204 executed thereon. To further enhance security, in one example, an authentication shim 210 is placed in the architecture 200, for instance, in communication with the device drivers 212 and 214, respectively, corresponding to monitor 24 and keyboard 28. Authentication shim 210 ensures that once keystroke data enters the system, the keystroke data cannot be tampered with before authentication processor 10. Likewise, authentication shim 210 also ensures that the priming images from the database(s) 16 reach the user 20, e.g., via monitor, and is not blocked by an obscuring window or panel.

Database(s) 16 are protected from modification to prevent or at least decrease the ability of the impostor to substitute his/her own response metric for the response metric of a legitimate user. In one example, database(s) 16 includes a prime image database 16A and a separate expected response database 16B that are explicitly paired such that even an attack that successfully replaces data one of the databases 16A or 16B will fail.

Figure 6:
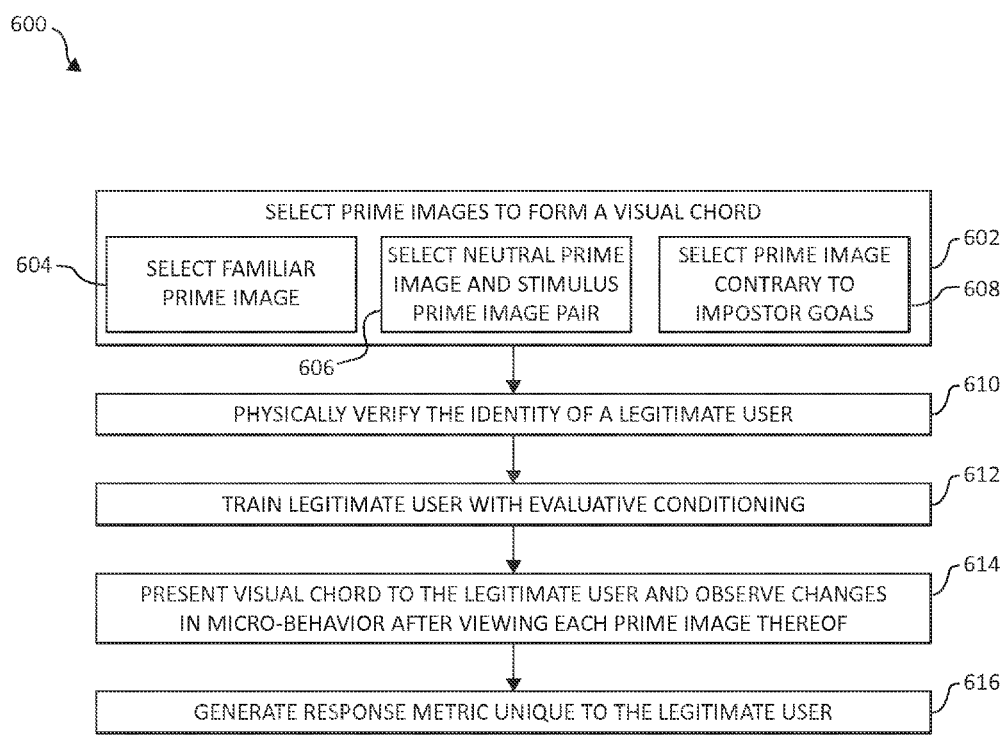
FIG. 6 is a flow chart illustrating a method of configuring an authentication system for a legitimate user, according to one embodiment of the present invention.

FIG. 6 illustrates one embodiment of a method 600 of configuring an authentication system for a legitimate user. At 602, prime images are selected to make up the visual chord for authenticating the legitimate user. In one example, selecting prime images at 602 includes one or more of, preferably, two or more of, selecting a familiar prime image at 604, selecting a neutral prime image paired with a stimulus prime image at 606, and selecting a prime image adverse to likely imposter goals at 608. At 604, familiar prime images are selected based on the personal relationships and past of the legitimate user. As described above, familiar prime images may be prime images that would be a natural prime to the general public expected to produce one behavioral change, but that produce a different behavior change in the legitimate user due to the legitimate user's familiarity with the subject of the prime image.

At 606, prime image pairs are selected that will be the subject of future evaluative conditioning. For example, a neutral prime image is a prime image that does not generally impact the emotions of a viewer or cause any significant changes in viewer micro-behavior. Such a prime image is chosen along with a visceral or instinctive stimulus prime image that generally evokes strong emotions that would be outwardly manifested in micro-behavior changes by a user. At 608, prime images are selected that, for example, represent law enforcement or trigger other emotions adverse to the illegal or wrongful goals of an imposter attempting to access a computer system based using an identity of the legitimate user rather than their own.

The identity of a legitimate user to be trained is physically verified at 610 using methods known or that will be known to be certain the individual is, in fact, the legitimate user. The verified, legitimate user then undergoes conditioning or training at 612. For example, during training, evaluative conditioning is used to repeatedly expose the legitimate user to the pair of prime images selected at 606, one after the other, both for durations only perceivable by the subconscious of the legitimate user and/or for consciously perceivable durations. The repeated pairing of the prime images via display results in transfer of the instinctive emotions and outward micro-behavior modifications from the stimulus prime image to the neutral prime image. Accordingly, while the neutral prime image remains neutral to the general public, it will no longer serve as a neutral prime image to the conditioned legitimate user, but will instead serve as a strong stimulus prime image for that pre-conditioned legitimate user. In one embodiment, the legitimate user is not consciously aware of the prime images being paired during evaluative conditioning, but instead completes other tasks on the computer system during the training period. Notably, while primarily described as occurring during a training phase, evaluative conditioning can continue or change periodically throughout the legitimate user's use of the computer system following verification of the identity of the user as will be apparent to those of skill in the art after reading the present application.

Following sufficient evaluative conditioning to emotionally pair the prime images at 612, then, at 614, the legitimate user is presented with the selected prime images making up the visual chord for the legitimate user in a similar manner as they will be presented with such prime images during later authentication using the authentication system of the current innovation. More specifically, the prime images or notes of the visual chord are presented one at a time in short durations that are not consciously perceivable by the legitimate user in between consciously perceivable prime images relating to tasks being completed by the legitimate user on the computer system. Micro-behavior changes are observed and recorded following the display of each visual chord note. At 616, these changes in micro-behavior as they relate to the visual chord notes are graphed and/or otherwise quantitated and used to collectively define a response metric that is unique to the legitimate user based on past personal experiences of the legitimate user and/or specific training of the legitimate user. The response metric will serve as the password or key signature for the legitimate user each time the legitimate user attempts to access the computer system. Notably, while steps 612, 614, and 616 may occur at a typical computer system station that the legitimate user will access in future interactions, in one example, computer system includes various computer system access stations that may be used for training and/or future access by the legitimate user. Other variations to the method 600 for configuring an authentication system for use by a legitimate user will be apparent to those of skill in the art upon reading the present application.

Figure 7:
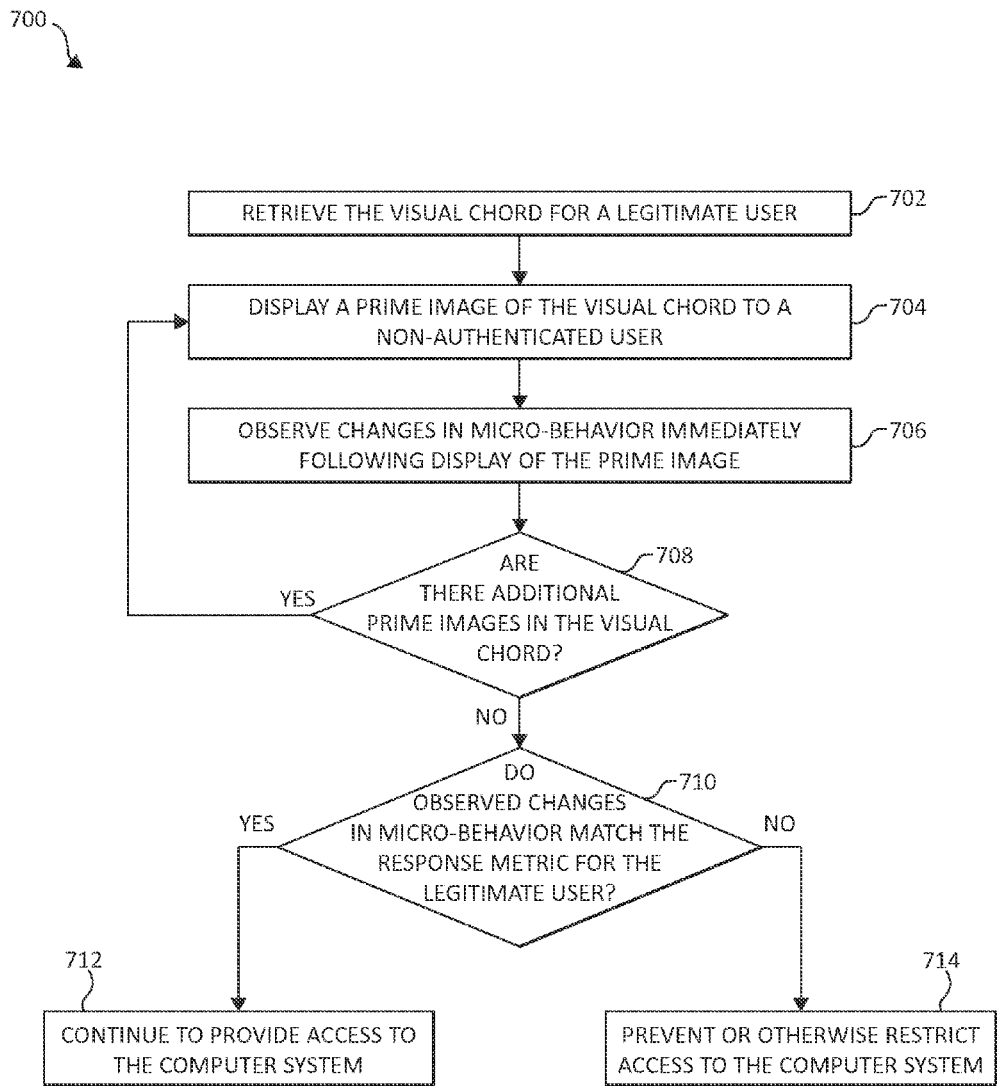
FIG. 7 is a flow chart illustrating one process of utilizing an authentication system, according to one embodiment of the present invention.

FIG. 7 illustrates one embodiment of a method 700 of authenticating a user to provide access to a secure computer system. At 702, after receipt of the purported identity of a legitimate user, the visual chord associated with that legitimate user is retrieved from the associated databases by the authentication processor. At 704, a note of the visual chord is displayed to the unknown user attempting to access the computer system. More particularly, in one example, the note is displayed to the unknown user for a short duration of time, typically perceivable only by the subconscious of the unknown user, interposed between typical screen displays presented to the user of the computer system attempting to complete other tasks using the computer system. In one example, the note is displayed at a level of conscious awareness, for example by sliding an image temporarily over the screen of a mobile computing device. At 706, changes in micro-behavior of the unknown user are observed such as keyboard and mouse dynamics. In one example, use of such dynamics as the observed micro-behaviors presents a non-invasive or generally physically perceivable manner of collecting data from the unknown user and that can use systems integrated into the computer system to quantify outward manifestations of the unknown user's response to the prime image. At 708, it is determined if additional notes of the visual chord remain that have not yet been displayed to the unknown user. If the answer is yes, steps 704, 706, and 708 are repeatedly performed until all the notes or prime images of the visual chord have been displayed to the user and associated micro-behavior observed and recorded.

Once all the notes have been displayed, etc., then, at 710, the observed changes in micro-behavior are assembled into an unknown user response metric that is compared to the legitimate user response metric on file following completion of method 600 (FIG. 6). If the unknown user response metric matches the legitimate user response metric within acceptable ranges of variation, then the unknown user is authenticated as being the legitimate user, and at 712, access to the computer system is allowed and/or continued to be allowed at the level of security previously assigned to the legitimate user. If the unknown user response metric differs from the legitimate user response metric more than acceptable ranges of variation, then at 714, the unknown user is deemed an imposter and further access to the computer system is prevented or at least restricted to a lower level of access than previously assigned to the legitimate user. While the described process of method 700 generally is described as occurring immediately upon unknown user interaction with the computer, in one embodiment, the authentication process is repeatedly performed throughout the user's interaction with the computer system for a continuous user authentication.

Authentication systems as described above create a secure environment in which is it particularly difficult for impostors or other attackers to infiltrate the secured computer system. By using subconscious responses by the legitimate users, the legitimate users are not consciously aware of the content of the authentication test, such that the legitimate user cannot disclose the authentication information to any attacker or other outside entity. The following descriptions are examples of some other ones of the most likely attacks to computer systems and how the authentication system of the current innovation mitigates those attacks.

In a first example attack, in order to access or continue to access the computer system, an impostor attempts to hijack a legitimate user's session. Such an impostor must not only match the keystroke dynamics of the legitimate user, but also must match the changes in the keystroke dynamics expected from a legitimate user subconsciously exposed to the sequence of prime images in the visual chord. This imposter task is complicated by use of a visual chord with multiple prime images each configured to evoke a particular micro-behavior change from the legitimate user. For example, the authentication system starts by creating a unique pairing of neutral stimuli prime images with strong stimuli, evaluatively conditioning the legitimate user to pair the emotional responses associated with the strong stimuli prime images to the corresponding neutral stimuli prime images, and repeating for multiple prime images until a complicated visual chord is created that will elicit a unique response from both the legitimate user and the impostor. The unique response may be characterized in a response metric including complex timing relationship between the priming event and the observed changes in micro-behavior. In addition, without mechanical assistance, the impostor cannot match the signature, as they cannot detect the subliminal flash of the prime images.

In a second example, an imposter attempts to steal the legitimate user's session during the training period. This example occurs for instance in a collaborative work environment in which colleagues may work together at the same monitor such that one colleague is exposed to the same evaluative conditioning as another colleague during common working times. While a colleague impostor of the legitimate user could attempt to access the legitimate users system or session, the colleague impostor, like the legitimate user, would react to the conditioned prime images, but in a unique way as compared to the legitimate user. However, using a visual chord with both familiar and evaluatively conditioned primes, the colleague imposter would have different reactions to the familiar primes even if their reaction were similar to that of the legitimate user for evaluatively conditioned primes. Consequently, the response metric for the colleague impostor would still differ significantly from the response metric of the legitimate user to restrict access to the computer system or session under the identification of the legitimate user.

In addition, in one embodiment, the authentication system, which may include the unique response metric and visual chord combination for all employees and colleagues in a given group, company, etc., moves to a colleague impostor identification mode upon realizing that the current user is not the legitimate user, but may be a colleague imposter (e.g., based on similar responses to conditioned prime images and differing response to familiar prime images). By comparing the portions of the response metric of the colleague imposter to similar portions of other response metrics saved to the authentication system databases, the authentication system can identify at least a list of colleague candidates that may be the colleague imposter. Subsequently, the authentication system can cycle through the visual chords of the candidate list until a match is found to the colleague imposters responses, thereby, identifying the colleague imposter without the impostor being alerted to the sequence of authentication and identification utilizing his subconscious observations and changes in micro-behaviors. This particular example, may be implemented on a centralized authentication processor operating on a server or network incorporating multiple computer systems as will be apparent to those of skill in the art upon reading this application.

In a third example, an impostor or other attacker inserts hardware between the keyboard and the computer and between the monitor and the computer. More specifically, with custom hardware, the attacker could queue up their keystrokes and have them play back in a timing pattern that will match that of a legitimate user. However, for such an attack to be successful against the current system the attacker would need a model of the legitimate user's subconscious and a way to detect priming evens and to know how priming events were conditioned. In one example, the authentication system addresses such an attack by stenographically altering each priming image to produce a unique data stream for each priming event. Humans cannot tell the difference between the stenographic prime image and its source prime image, but the underlying data representation will have changed entirely. As such, the prime image will still work for the legitimate user, but the attacker will be prevented from knowing which prime image was flashed by a simple data comparison. In one embodiment, different versions of a familiar prime image may be use, e.g., a number of different pictures of a grandmother of the legitimate user. Accordingly, for the attack software to work it will need to include facial recognition that results in a lag from display of the priming image to the keyboard dynamic change that would not occur during human subconscious response. This lag is detectable by the authentication system as a difference signifying a possible imposter or other attack to the computer system. Other further security measures can be taken in selecting prime images that will be particularly difficult for attackers to identify or otherwise increase the workload for any attacker hardware while not requiring additional hardware on the authentication system side. Accordingly, this authentication system shifts the authentication aspect of computer security to the defender's advantage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A non-transitory computer readable medium includes a hard drive, compact disc, flash memory, volatile memory, etc. but does not include a transitory signal per se.

Program code embodied on a computer readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowchart and block diagram in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

What is claimed is:

1. A method performed by a hardware processor for authenticating an unknown user claiming to be a legitimate user, the method comprising:
   presenting, by the hardware processor, to the unknown user a plurality of prime images, wherein the plurality of prime images are presented to the unknown user in an amount of time that is less than or equal to 16 milliseconds such that the plurality of prime images are consciously unperceivable and subconsciously perceivable by the unknown user to induce one or more conditioned responses;
   observing, by the hardware processor, one or more responses, by the unknown user, to the plurality of prime images that are consciously unperceivable and subconsciously perceivable by the unknown user;
   generating, by the hardware processor, an unknown user response metric based on the observed one or more responses;
   comparing, by the hardware processor, a known conditioned user response metric to the unknown user response metric;
   one of preventing access to a computer system and decreasing a level of access to the computer system when the unknown user response metric differs from the conditioned user response metric by more than a predefined degree of acceptable variation, wherein the conditioned user response metric represents observed changes in micro-behaviors of the legitimate user in response to viewing the plurality of prime images, and the unknown user response metric represents observed changes in micro-behaviors of the unknown user in response to viewing the plurality of prime images; and one of granting access to the computer system and maintaining the level of access to the computer system when the unknown user response metric matches the legitimate user response metric by less than the predefined degree of acceptable variation.

2. The method of claim 1, wherein the micro-behaviors include keyboard dynamics.

3. The method of claim 1, further comprising:
presenting the plurality of prime images to the unknown user claiming to be the legitimate user on a display device of the computer system as the unknown user attempts to access the computer system.

4. The method of claim 3, wherein presenting the plurality of prime images to the unknown user includes presenting each of the plurality of prime images for an amount of time that is less than 16 milliseconds.

5. The method of claim 3, further comprising:
observing micro-behavior responses exhibited by the unknown user after the unknown user views each of the plurality of prime images; and
generating the unknown user response metric based on the observed micro-behavior responses.

6. The method of claim 5, wherein the unknown user is presented each of the plurality of prime images subconsciously, and micro-behavior responses are observed in a manner substantially unperceivable by the unknown user.

7. The method of claim 1, further comprising:
presenting the plurality of prime images to the legitimate user on a display device of the computer system, each of the plurality of prime images being selected to elicit observable behavioral changes when viewed by the legitimate user, wherein presenting the plurality of prime images to the legitimate user occurs prior to comparing the legitimate user response metric to the unknown user response metric.

8. The method of claim 7, further comprising:
selecting each prime image of the plurality of prime images including selecting a familiar prime image.

9. The method of claim 7, further comprising:
selecting each prime image of the plurality of prime images including selecting a neutral prime image.

10. The method of claim 9, further comprising:
selecting a stimulus prime image to pair with the neutral prime image, the stimulus prime image being selected to produce an observable change in the micro-behavior of the legitimate user upon viewing the stimulus prime image; and
evaluatively conditioning the legitimate user to have the observable change in micro-behavior in response to the neutral prime image.

11. The method of claim 10, wherein evaluatively conditioning the legitimate user includes repeatedly presenting the neutral prime image and the stimulus prime image in sequence for time durations consciously unperceivable by the legitimate user.

12. The method of claim 7, wherein presenting the plurality of prime images to the legitimate user includes presenting each of the plurality of prime images between task images displayed for durations longer than a conscious viewing threshold.

13. The method of claim 7, further comprising:
selecting each prime image of the plurality of prime images including selecting at least one neutral prime image for evaluative conditioning and selecting at least one familiar prime image.

14. The method of claim 7, further comprising:
observing the micro-behavior responses exhibited by the legitimate user after viewing each of the plurality of prime images and generating the legitimate user response metric representing the micro-behavior responses exhibited by the legitimate user.

15. A computer program product comprising a non-transitory, computer readable storage medium having computer-readable program code portions stored therein, the computer-readable program code configured for executing a method for verifying an identity of an unknown user attempting to access a computer system and claiming to be a legitimate user, comprising:
computer code for presenting, by a hardware processor, to the unknown user a plurality of prime images, wherein the plurality of prime images are presented to the unknown user an amount of time that is less than or equal to 16 milliseconds such that the plurality of prime images are consciously unperceivable and subconsciously perceivable by the unknown user to induce one or more conditioned responses;
computer code for observing, by the hardware processor, one or more responses by the unknown user to the plurality of prime images that are consciously unperceivable and subconsciously perceivable by the unknown user;
computer code for generating, by the hardware processor, an unknown user response metric based on the observed one or more responses;
computer code for comparing a known conditioned user response signature to an unknown user response signature;
one of computer code for preventing access to a computer system and computer code for decreasing a level of access to the computer system when the unknown user response signature differs from the conditioned user response signature by more than an acceptable threshold of variation, wherein the conditioned user response signature represents observed changes in micro-behaviors of the legitimate user in response to subconscious viewing of the plurality of prime images, and the unknown user response signature represents observed changes in micro-behaviors of the unknown user in response to subconscious viewing of the plurality of prime images; and
one of computer code for granting access to the computer system and computer code for maintaining the level of access to the computer system when the unknown user response metric matches the legitimate user response metric by less than the predefined degree of acceptable variation.

16. The computer program product of claim 15, further comprising:
computer code for presenting the plurality of prime images to the unknown user claiming to be the legitimate user on a display device of the computer system as the unknown user attempts to access the computer system.

17. The computer program product of claim 15, wherein the computer code for presenting the plurality of prime images to the unknown user comprises computer code for presenting each of the plurality of prime images for an amount of time that is less than 16 milliseconds.

18. The computer program product of claim 15, further comprising:
   computer code for observing micro-behavior responses exhibited by the unknown user after the unknown user views each of the plurality of prime images; and
   computer code for generating the unknown user response signature based on the micro-behavior responses exhibited by the unknown user.

19. The computer program product of claim 18, wherein the unknown user is presented each of the plurality of prime images subconsciously, and micro-behavior responses are observed in a manner substantially unperceivable by the unknown user.

20. A system for authenticating a user attempting to access a computer system, the system comprising:
   a hardware processor operable with the computing system, wherein the processor is configured for:
      presenting, by the hardware processor, to the unknown user a plurality of prime images, wherein the plurality of prime images are presented to the unknown user in an amount of time that is less than or equal to 16 milliseconds such that the plurality of prime images are consciously unperceivable and subconsciously perceivable by the unknown user to induce one or more conditioned responses,
      observing, by the hardware processor, one or more responses by the unknown user to the plurality of prime images that are consciously unperceivable and subconsciously perceivable by the unknown user,
      generating, by the hardware processor, an unknown user response metric based on the observed one or more responses;
   comparing a known conditioned user response metric to an unknown user response metric,
   one of preventing access to a computer system and decreasing a level of access to the computer system when the unknown user response metric differs from the conditioned user response metric by more than a predefined degree of acceptable variation, wherein the conditioned user response metric represents observed changes in micro-behaviors of the legitimate user in response to subconscious viewing of the plurality of prime images, and the unknown user response metric represents observed changes in micro-behaviors of the unknown user in response to subconscious viewing of the plurality of prime images, and
   one of granting access to the computer system and maintaining the level of access to the computer system when the unknown user response metric matches the legitimate user response metric by less than the predefined degree of acceptable variation.

* * * * *